(12) United States Patent
Gieske

(10) Patent No.: US 12,384,041 B2
(45) Date of Patent: Aug. 12, 2025

(54) APPARATUS, SYSTEM, AND METHOD FOR CALIBRATING A DEVICE BY DETERMINING A REFERENCE POINT

(71) Applicant: Toyota Motor Engineering & Manufacturing North America, Inc., Plano, TX (US)

(72) Inventor: Joseph D. Gieske, Erlanger, KY (US)

(73) Assignees: Toyota Motor Engineering & Manufacturing North America, Inc., Plano, TX (US); Toyota Jidosha Kabushiki Kaisha (JP)

(*) Notice: Subject to any disclaimer, the term of this patent is extended or adjusted under 35 U.S.C. 154(b) by 253 days.

(21) Appl. No.: 18/218,461

(22) Filed: Jul. 5, 2023

(65) Prior Publication Data
US 2025/0010477 A1   Jan. 9, 2025

(51) Int. Cl.
*B25J 19/02* (2006.01)
*B25J 9/16* (2006.01)

(52) U.S. Cl.
CPC ............ *B25J 9/1692* (2013.01); *B25J 19/02* (2013.01)

(58) Field of Classification Search
CPC ........ B25J 9/1692; B25J 9/1697; B25J 19/02; G05B 2219/39024; G05B 2219/39045
See application file for complete search history.

(56) References Cited

U.S. PATENT DOCUMENTS

| | | | |
|---|---|---|---|
| 1,583,718 A | 5/1926 | Reginald | |
| 11,389,171 B2* | 7/2022 | Goldsmith | A61B 17/3468 |
| 11,489,309 B2* | 11/2022 | Martin | H01R 43/28 |
| 11,637,951 B2* | 4/2023 | Voss | G02B 7/08 |
| | | | 348/211.7 |

(Continued)

FOREIGN PATENT DOCUMENTS

| | | |
|---|---|---|
| JP | 2011240391 A | 12/2011 |
| KR | 101416394 B1 | 7/2014 |

(Continued)

OTHER PUBLICATIONS

Koch et al., Using Polygons to Recognize and Locate Partially Occluded Objects, 1987, IEEE, p. 483-494 (Year: 1987).*

(Continued)

*Primary Examiner* — McDieunel Marc
(74) *Attorney, Agent, or Firm* — Snell & Wilmer LLP

(57) ABSTRACT

Apparatuses, systems, and methods for calibrating a device by determining a reference point for working on an object. An apparatus includes a pin member, a shell member, an elastic member, and a base member. The pin member includes a tip, a protrusion, a first mark, and a distal end. The shell member includes a second mark and an opening and receives at least a first portion of the pin member therethrough. The opening exposes the first mark when the first mark is aligned with the second mark. The elastic member receives at least a second portion of the pin member therethrough. A portion of the elastic member is received within the shell member. The base member receives at least a third (Continued)

portion of the pin member therethrough and includes a rim member that receives the third portion of the pin member therethrough and supports one end of the elastic member.

20 Claims, 7 Drawing Sheets

(56) References Cited

U.S. PATENT DOCUMENTS

2022/0250197 A1    8/2022    Martin et al.

FOREIGN PATENT DOCUMENTS

| KR | 101558677 B1 | 10/2015 |
|---|---|---|
| WO | 2022132885 A1 | 6/2022 |

OTHER PUBLICATIONS

Hubber et al., 2-D contact detection and localization using proprioceptive information, 1994, IEEE, p. 23-33 (Year: 1994).*

Gueziec et al., Anatomy-based registration of CT-scan and intraoperative X-ray images for guiding a surgical robot, 1998, IEEE, p. 715-728 (Year: 1998).*

Sanders et al., Measurement of stresses in three orthogonal directions at the residual limb-prosthetic socket interface, 1993, IEEE, p. 79-82 (Year: 1993).*

* cited by examiner

APPARATUS, SYSTEM, AND METHOD FOR CALIBRATING A DEVICE BY DETERMINING A REFERENCE POINT

BACKGROUND

Field

The present disclosure relates to apparatuses, systems, and methods for calibrating a device by determining a reference point for working on an object.

Description of the Related Art

In automated manufacturing plants (such as, e.g., automated vehicle manufacturing plants), a robot (e.g., a robotic arm) needs to perform its tasks with high accuracy and precision. For example, such a robot is controlled based on a monitored coordinate system. The monitored coordinate system is used to guide the robot. An end of the robot (e.g., an end of a robotic arm) may be used as a reference point for the guidance of the robot. However, when a tool is attached to the end of the robot, an adjustment needs to be made to the monitored coordinate system for the guidance of the robot to account for the presence of the tool at the end of the robot. A tool center point (TCP) may be used as an adjusted reference point (i.e., instead of the end of the robot) to provide the necessary adjustment to enable a controller of the robot to shift the monitored coordinate system to guide the tool accurately and precisely.

One method of using the TCP to enable the controller of the robot to shift the monitored coordinate system to guide the tool may involve using a sensor (e.g., when a part or a workpiece to be worked on changes its location, orientation, or the like). However, the calibration of the robot (e.g., using the sensor) or the calibration of the sensor itself to find the adjusted reference point such as, e.g., the TCP to shift the monitored coordinate system may carry a risk of damaging a part that the robot may need to work on. That is, if the calibration of the robot or the calibration of the sensor is done incorrectly, the tool attached to the end of the robot may be controlled to perform work on an unintended portion of the part or to unintentionally strike the part before any work is performed (e.g., during the calibration of the robot or the calibration of the sensor) or while the work is being performed. For example, while a conventional robotic arm system may be able to accurately pinpoint a TCP in two-dimensional space (e.g., in x and y directions), it may have low accuracy for the third dimension (e.g., in z direction). The low accuracy in the third dimension (e.g., in the z direction) regarding the TCP may result in the risks of damaging the part to be worked on or inaccurate performance of the work.

Hence, there is a need for apparatuses, systems, and methods for calibrating a device by determining a reference point for working on an object.

SUMMARY

Described herein is a system for calibrating a device by determining a reference point for working on an object. The system may include a calibration apparatus. The calibration apparatus may be removably connected to the device. The calibration apparatus may include a pin member. The pin member may include a tip, a protrusion, a first mark, and a distal end. The calibration apparatus may include a shell member. The shell member may include a second mark and an opening. The shell member may receive at least a first portion of the pin member including the protrusion therethrough starting from the tip on the pin member. The opening may expose the first mark on the pin member when the first mark on the pin member is aligned with the second mark on the shell member. The calibration apparatus may include an elastic member. The elastic member may receive at least a second portion of the pin member therethrough starting from the distal end on the pin member. At least a portion of the elastic member may be received within the shell member. The calibration apparatus may include a base member. The base member may receive at least a third portion of the pin member therethrough starting from the distal end on the pin member. The base member may include a rim member. The rim member may receive at least the third portion of the pin member therethrough starting from the distal end on the pin member. The rim member may support one end of the elastic member such that the elastic member is disposed between the protrusion on the pin member and the rim member on the base member and engages the protrusion on the pin member to push the pin member away from the base member.

The system may include a processor. The processor may be connected to the device. The processor may be configured to determine an expected set of coordinates of a predetermined point on the object based on sensor data detected by one or more sensors coupled to the processor. The processor may be configured to determine an actual set of coordinates of the predetermined point on the object based on a position of the tip on the pin member. The processor may be configured to determine an offset between the expected set of coordinates of the predetermined point on the object and the actual set of coordinates of the predetermined point on the object. The processor may be configured to store data including the offset on a memory connected to the processor. The processor may be configured to determine the reference point based on the stored data.

Also described is an apparatus for calibrating a device by determining a reference point for working on an object. The apparatus may include a pin member. The pin member may include a tip, a protrusion, a first mark, and a distal end. The apparatus may include a shell member. The shell member may include a second mark and an opening. The shell member may receive at least a first portion of the pin member including the protrusion therethrough starting from the tip on the pin member. The opening may expose the first mark on the pin member when the first mark on the pin member is aligned with the second mark on the shell member. The apparatus may include an elastic member. The elastic member may receive at least a second portion of the pin member therethrough starting from the distal end on the pin member. At least a portion of the elastic member may be received within the shell member. The apparatus may include a base member. The base member may receive at least a third portion of the pin member therethrough starting from the distal end on the pin member. The base member may include a rim member. The rim member may receive at least the third portion of the pin member therethrough starting from the distal end on the pin member. The rim member may support one end of the elastic member such that the elastic member is disposed between the protrusion on the pin member and the rim member on the base member and engages the protrusion on the pin member to push the pin member away from the base member.

Moreover, also described is a method for calibrating a device by determining a reference point for working on an object. The method may include providing a calibration apparatus. The calibration apparatus may be removably connected to the device. The calibration apparatus may include a pin member. The pin member may include a tip, a protrusion, a first mark, and a distal end. The calibration apparatus may include a shell member. The shell member may include a second mark and an opening. The shell member may receive at least a first portion of the pin member including the protrusion therethrough starting from the tip on the pin member. The opening may expose the first mark on the pin member when the first mark on the pin member is aligned with the second mark on the shell member. The calibration apparatus may include an elastic member. The elastic member may receive at least a second portion of the pin member therethrough starting from the distal end on the pin member. At least a portion of the elastic member may be received within the shell member. The calibration apparatus may include a base member. The base member may receive at least a third portion of the pin member therethrough starting from the distal end on the pin member. The base member may include a rim member. The rim member may receive at least the third portion of the pin member therethrough starting from the distal end on the pin member. The rim member may support one end of the elastic member such that the elastic member is disposed between the protrusion on the pin member and the rim member on the base member and engages the protrusion on the pin member to push the pin member away from the base member. The method may include determining, by a processor connected to the device, an expected set of coordinates of a predetermined point on the object based on sensor data detected by one or more sensors coupled to the processor. The method may include determining, by the processor, an actual set of coordinates of the predetermined point on the object based on a position of the tip on the pin member. The method may include determining, by the processor, an offset between the expected set of coordinates of the predetermined point on the object and the actual set of coordinates of the predetermined point on the object. The method may include storing, by the processor, data including the offset on a memory connected to the processor. The method may include determining, by the processor, the reference point based on the stored data. The method may include actuating, by the processor, the device to work on the object based on the determined reference point.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes apparatuses, systems, and methods for calibrating a device by determining a reference point for working on an object. These apparatuses, systems, and methods provide many benefits and advantages including enabling a device (e.g., a robot or a robotic arm) to quickly and easily pinpoint a tool center point (TCP) in three-dimensional space (e.g., in x, y, and z directions) with high accuracy and precision.

The disclosed apparatuses, systems, and methods may utilize a calibration apparatus including a pin with a tip and a body (including a shell) with an internal spring. The calibration apparatus may be notched around both the pin and the body. The internal spring allows the position of the tip on the pin to be adjusted in z direction until the notches are lined up to ensure that the TCP is correctly determined with high accuracy in x, y, and z directions. Additionally, when the TCP is calibrated or verified using a part, the presence of the internal spring can protect the part from being damaged by the tip even if the tip is moved too far in the +z direction (i.e., towards the part). The internal spring allows the pin to retract in towards a base of the calibration apparatus if the tip is pressed against the part (also referred to herein as an object or a workpiece) and then to return to an original position when the tip is brought away from the part or the object. The base of the calibration apparatus allows the calibration apparatus to be mounted (e.g., removably) on an end of a device or a tool (e.g., a robot gun or an end effector).

The pin and the shell may each have a thin notch inscribed around an outer diameter. The notch on the pin may be observed through one or more openings (e.g., viewport cutouts) on the shell. When the pin is retracted towards the base (e.g., when the tip on the pin is pressed against a part or an object), the two notches may be visible simultaneously (i.e., the notch on the pin may be visible through the one or more openings on the shell, and the notch on the shell may be visible on the outer diameter of the shell), and the device or the tool may be manipulated such that the two notches may be aligned. The alignment of the two notches enables the TCP to be determined with high accuracy.

Figure 1:
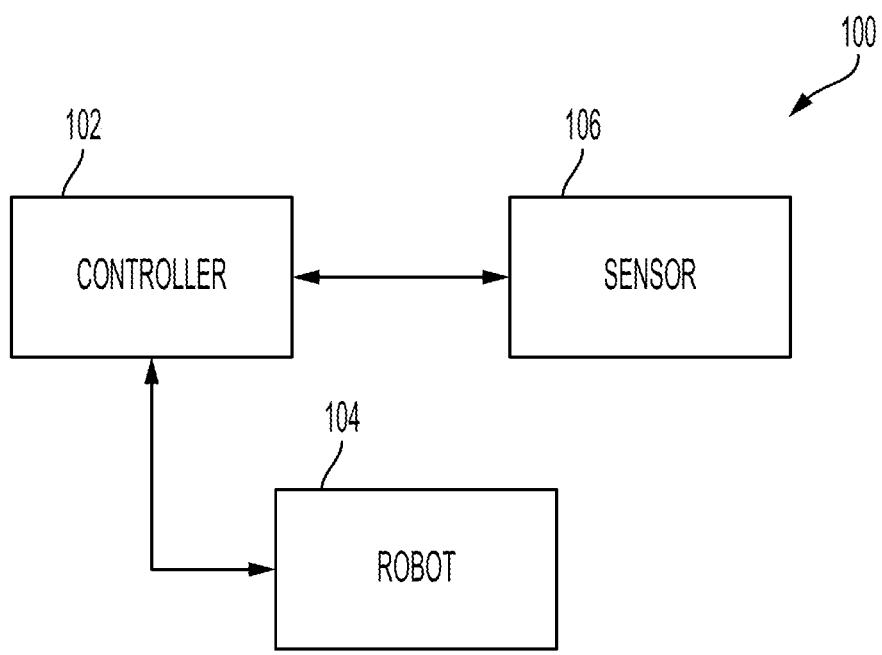
FIG. 1 is a block diagram illustrating a system for calibrating a device by determining a reference point for working on an object according to an embodiment of the present invention.

Turning to FIG. 1, a block diagram illustrating a system 100 for calibrating a device by determining a reference point for working on an object is shown. The system 100 includes a controller 102. The controller 102 may be connected to the device (e.g., a robot 104). The robot 104 may be or include a tool (e.g., a robot gun or an end effector) for performing a task or work on the object. In some embodiments, the controller 102 may also be connected to one or more sensors 106.

The controller 102 may include or couple to one or more processors. These one or more processors may be implemented as a single processor or as multiple processors. For example, the controller 102 may be a microprocessor, a data processor, a microcontroller, or other controller, and may be electrically coupled to at least the robot 104. The controller 102 may be a dedicated controller configured to control the connected robot 104 or may be coupled to or be a part of another controller which controls other devices.

The robot 104 (also referred to herein as a device or a tool) may be any robot configured to perform one or more tasks on an object or a part, e.g., in an automated manufacturing plant. The robot 104 may perform the one or more tasks automatically (i.e., without a manual human control) or based, at least in part, on a control by an operator (e.g., driven by the controller 102 actuating the robot 104 based on input from the operator, maneuvered manually by the operator physically moving or driving the robot 104, etc.).

The one or more sensors 106 may be or include one or more individual sensors and may be configured to detect sensor data. For example, the one or more sensors 106 may be or include an image sensor (such as, e.g., a radar sensor, a LIDAR sensor, and/or a camera, or any other image sensor capable of detecting light having any wavelength) configured to detect image data. The one or more sensors 106 may be disposed, e.g., on the robot 104 or any other part of the automated manufacturing plant and be connected to the controller 102 via wire or wirelessly. The sensor data (e.g., the image data) detected by the one or more sensors 106 may be used by the controller 102 to control the robot 104.

Figure 2A:
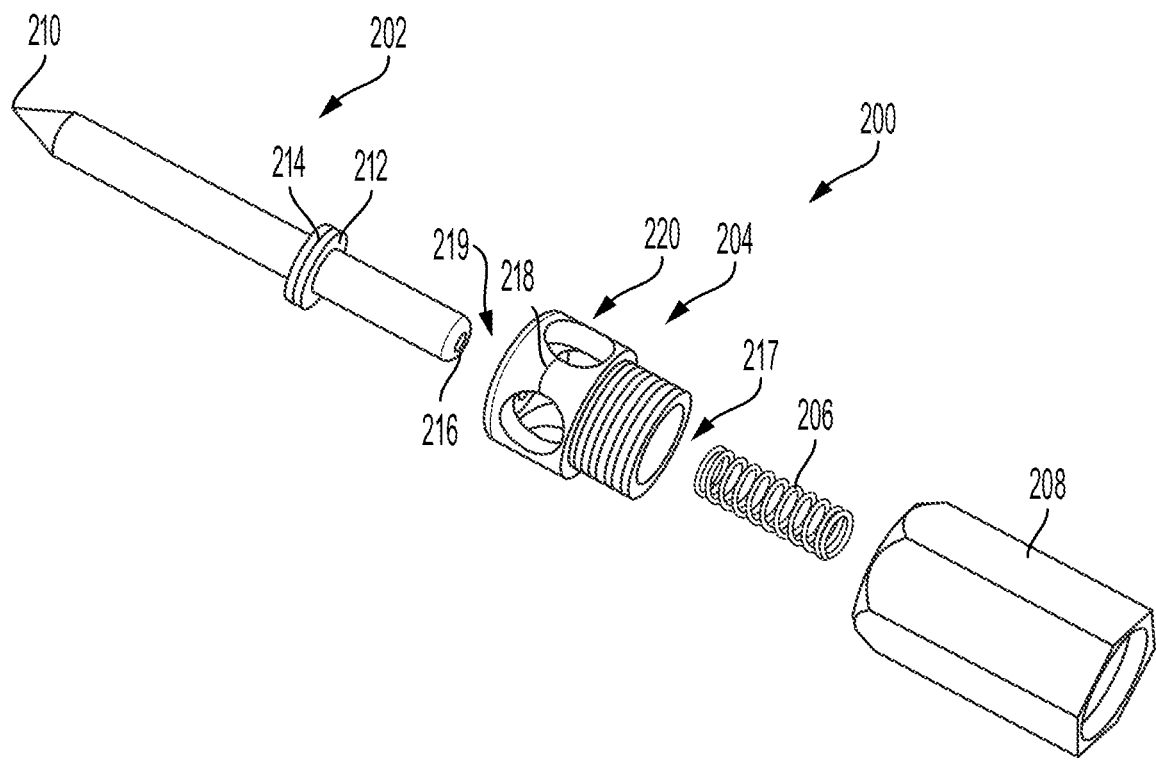
FIG. 2A is an illustration of an exploded view of an apparatus for calibrating a device by determining a reference point for working on an object according to an embodiment of the present invention.

FIG. 2A is an illustration of an exploded view of a calibration apparatus 200 for calibrating a device (e.g., the robot 104 described herein with respect to FIG. 1) by determining a reference point for working on an object. The calibration apparatus 200 may be connected to the device. In some embodiments, the calibration apparatus 200 may be removably connected to the device such that the calibration apparatus 200 may be removed from the device to be connected to and utilized for another device.

In various embodiments, the calibration apparatus 200 may include a pin member 202, a shell member 204, an elastic member 206, and a base member 208. The pin member 202 may include a tip 210, a protrusion 212, a first mark 214, and a distal end 216. The shell member 204 may include a first opening 217, a second mark 218, a second opening 219, and one or more side openings 220. In some embodiments, the shell member 204 may receive at least a first portion of the pin member 202 (e.g., including the protrusion 212). The shell member 204 may receive the pin member 202 through the first opening 217, starting from the tip 210 on the pin member 202. The tip 210 may go through the first opening 217 and then the second opening 219, and at least the protrusion 212 may be enclosed within the shell member 204. Inner diameter of the second opening 219 may be smaller than inner diameter of the first opening 217 such that, e.g., the protrusion 212 on the pin member 202 may be received through the first opening 217 and may not exit through the second opening 219. In various embodiments, the one or more side openings 220 may expose the first mark 214 when, e.g., the first mark 214 is aligned with the second mark 218 while the pin member 202 is received, at least in part, within the shell member 204. In some embodiments, size (e.g., thickness) of the first mark 214 and/or the second mark 218 may depend on a margin of error associated with an object, a sensor, or the like (i.e., the thickness of the first mark 214 and/or the second mark 218 may be designed to be sufficient to account for at least the margin of error of a calibration system such as, e.g., the system 100 described herein with respect to FIG. 1).

The elastic member 206 may receive at least a second portion of the pin member 202, starting from the distal end 216 on the pin member 202. In some embodiments, at least a portion of the elastic member 206 may be received within the shell member 204. The second portion of the pin member 202 received through the elastic member 206 may not include the protrusion 212. That is, outer diameter of the elastic member 206 may be smaller than outer diameter of the protrusion 212 and larger than outer diameter of the pin member 202. As but one example, the elastic member 206 may be a spring or any component configured to switch between a first state (e.g., a retracted state) and a second state (e.g., a non-retracted state).

Figure 2B:
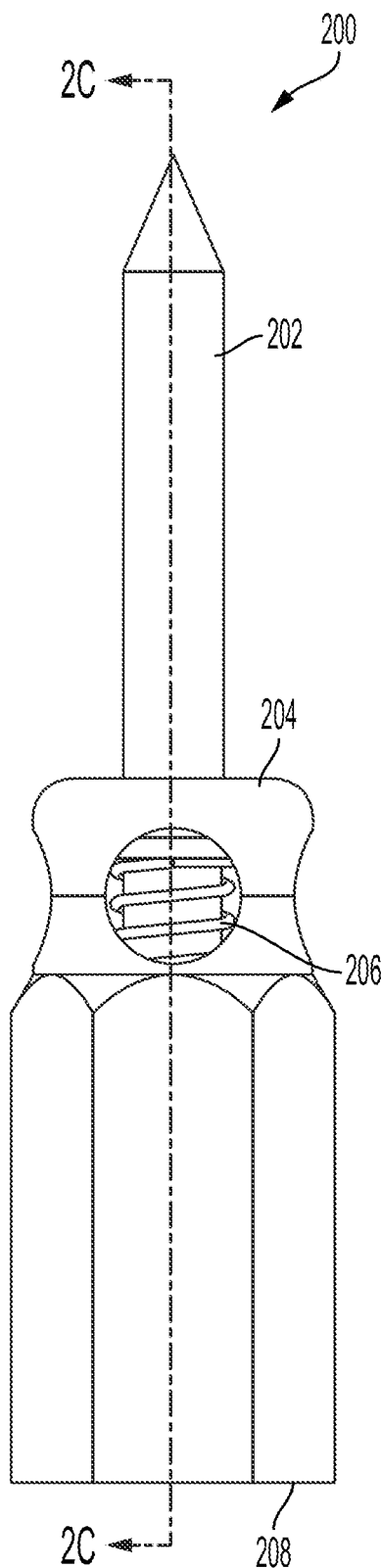
FIG. 2B is an illustration of a side view of an assembled apparatus for calibrating a device by determining a reference point for working on an object according to an embodiment of the present invention.

In some embodiments, the base member 208 may receive at least a third portion of the pin member 202 therethrough, starting from the distal end 216 on the pin member 202. In some embodiments, the base member 208 may receive at least a portion of the elastic member 206. The base member 208 may support the elastic member 206 on one end of the elastic member 206 while the protrusion 212 on the pin member 202 may support the elastic member 206 on an opposite end of the elastic member 206 when the calibration apparatus 200 is assembled. FIG. 2B is an illustration of a side view of the calibration apparatus 200 in an assembled state. In some embodiments, the distal end 216 on the pin member 202 may be received through the elastic member 206 only partially—that is, the distal end 216 on the pin member 202 may extend through, e.g., a quarter, a half, or three quarters of the way through the elastic member 206.

Figure 2C:
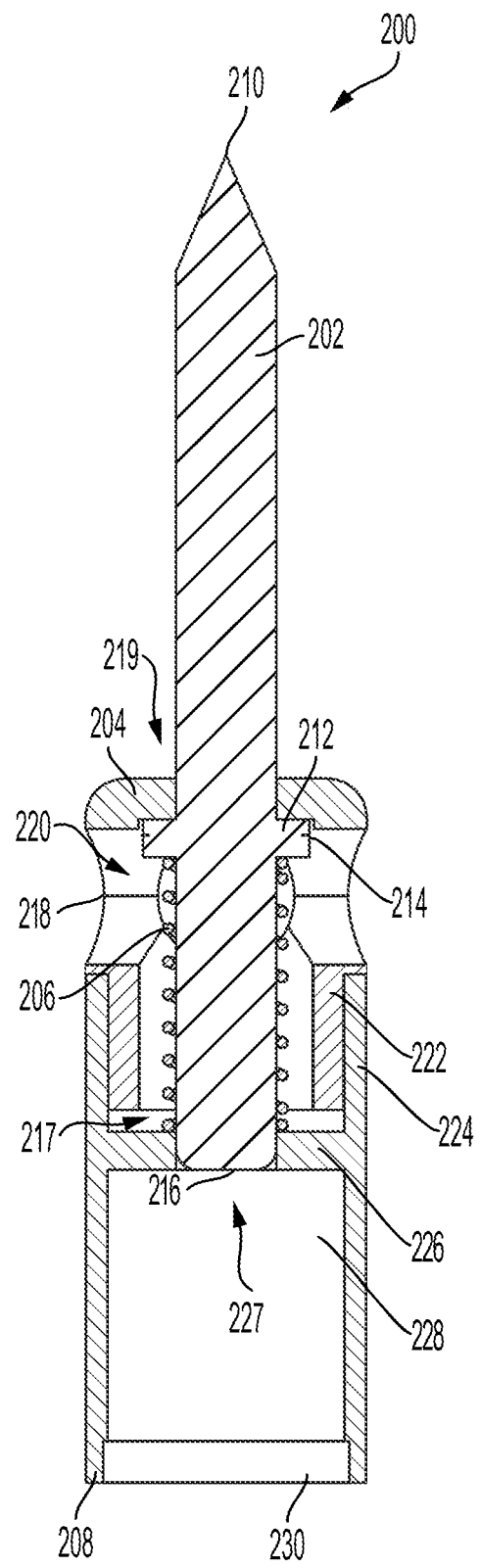
FIG. 2C is an illustration of a cross-sectional view of an assembled apparatus for calibrating a device by determining a reference point for working on an object according to an embodiment of the present invention.

Referring now to FIG. 2C, which is an illustration of a cross-sectional view of the calibration apparatus 200 in the assembled state shown in FIG. 2B (i.e., of the 2C-2C plane), the base member 208 may include a rim member 226 which may receive at least the third portion of the pin member 202 therethrough, starting from the distal end 216 on the pin member 202. In various embodiments, the rim member 226 (which may have the shape of a ring, a rim, a flange, or the like) supports one end of the elastic member 206 such that the elastic member 206 is disposed between the protrusion 212 on the pin member 202 and the rim member 226 on the base member 208 when the calibration apparatus 200 is in the assembled state as shown in FIG. 2B. As shown in FIG. 2C, the rim member 226 may extend radially inward from the inner wall of the base member 208. It would be apparent to one of ordinary skill in the art that the location of the rim member 226 on the inner wall of the base member 208 may vary (e.g., towards the end of the base member 208 receiving the shell member 204 or the opposite end of the base member 208) without departing from the spirit of the present disclosure.

As shown, the shell member 204 may include a first connecting portion 222, and the base member 208 may include a second connecting portion 224. The first connecting portion 222 on the shell member 204 and/or the second connecting portion 224 on the base member 208 may include, e.g., a plurality of grooves for connecting the first connecting portion 222 on the shell member 204 and the second connecting portion 224 on the base member 208—that is, the first connecting portion 222 on the shell member 204 may engage the second connecting portion 224 on the base member 208 to attach the shell member 204 to the base member 208 while a portion of the pin member 202 and the elastic member 206 are enclosed within the shell member 204 and the base member 208 when the calibration apparatus 200 is in the assembled state.

When the pin member 202 (i.e., the tip 210) is brought to be in contact with an object or a part to be worked on, the pin member 202 may be pushed towards the base member 208, causing the elastic member 206 to retract as the pin member 202 is pushed towards the base member 208. As the pin member 202 is pushed towards the base member 208, the pin member 202 may be pushed through the elastic member 206 (and, in some embodiments, through a rim member opening 227 of the rim member 226 and into a cavity 228 within the base member 208), allowing the first mark 214 to be shown through the one or more side openings 220.

Moreover, the base member 208 may include a connector 230 which may be used for connecting the base member 208 (i.e., the calibration apparatus 200 when assembled as described herein) to a device (e.g., the robot 104 described herein with respect to FIG. 1). The connector 230 may be any type of a connector known in the art such as, e.g., a connector having a plurality of grooves that may be engageable with a connector on the device (e.g., the robot 104 described herein with respect to FIG. 1).

Figure 3A:
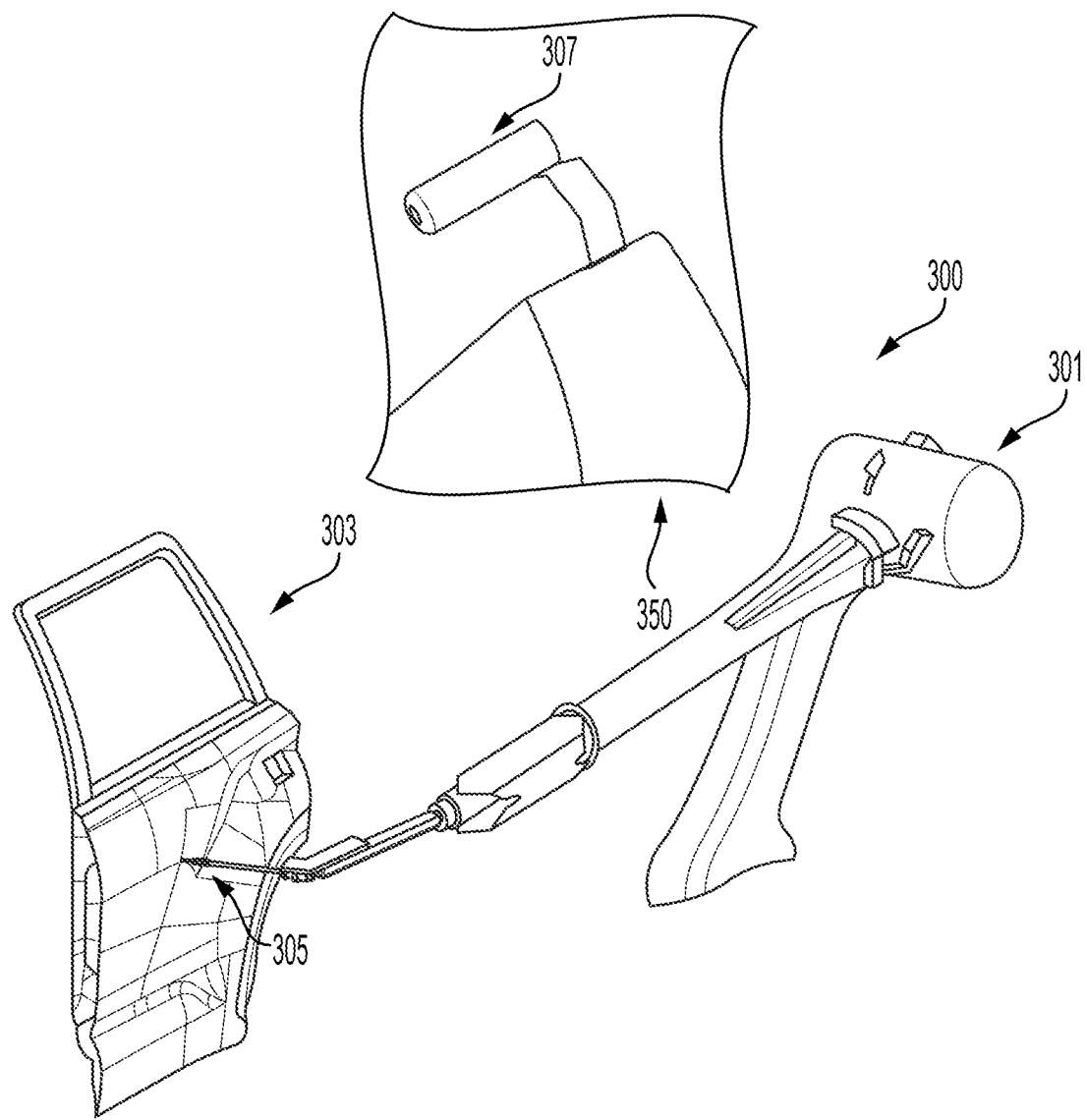
FIG. 3A is an illustration of a perspective view of a system for calibrating a device by determining a reference point for working on an object according to an embodiment of the present invention.

FIG. 3A is an illustration of a perspective view of a system 300 for calibrating a device by determining a reference point for working on an object. The system 300 may include a device 301 (e.g., the robot 104 described herein with respect to FIG. 1) and an object 303 (e.g., a part to be worked on by the device 301). The device 301 may be or include a tool (e.g., a robot) designed to perform a task or work on the object 303. The object 303 may be a part (e.g., a door for a vehicle) to be worked on by the device 301. The device 301 may be connected to a calibration apparatus 305 (e.g., the calibration apparatus 200 described herein with respect to FIGS. 2A-3C) as shown. In some embodiments, the system 300 may also include one or more sensors 307 (e.g., connected to the device 301 or a controller 350 (e.g., similar to the controller 102 described herein with respect to FIG. 1)).

The controller 350 and the one or more sensors 307 may function similarly as, respectively, the controller 102 and the one or more sensors 106 described herein with respect to FIG. 1. That is, the one or more sensors 307 may detect sensor data (e.g., image data) of, e.g., the object 303 and the calibration apparatus 305, and the controller 350, which may be connected to the device 301 and the one or more sensors 307 in some embodiments, may receive the detected sensor data and control the device 301 based at least on the detected sensor data. In some embodiments, the controller 350 may be used for calibrating the device 301 and/or the one or more sensors 307 based at least on the detected sensor data and using the calibration apparatus 305. The controller 350 may control the device 301 automatically or based on user input.

The controller 350 may allow the device 301 to be manipulated manually, e.g., by an operator physically moving or driving the device 301.

Figure 3B:
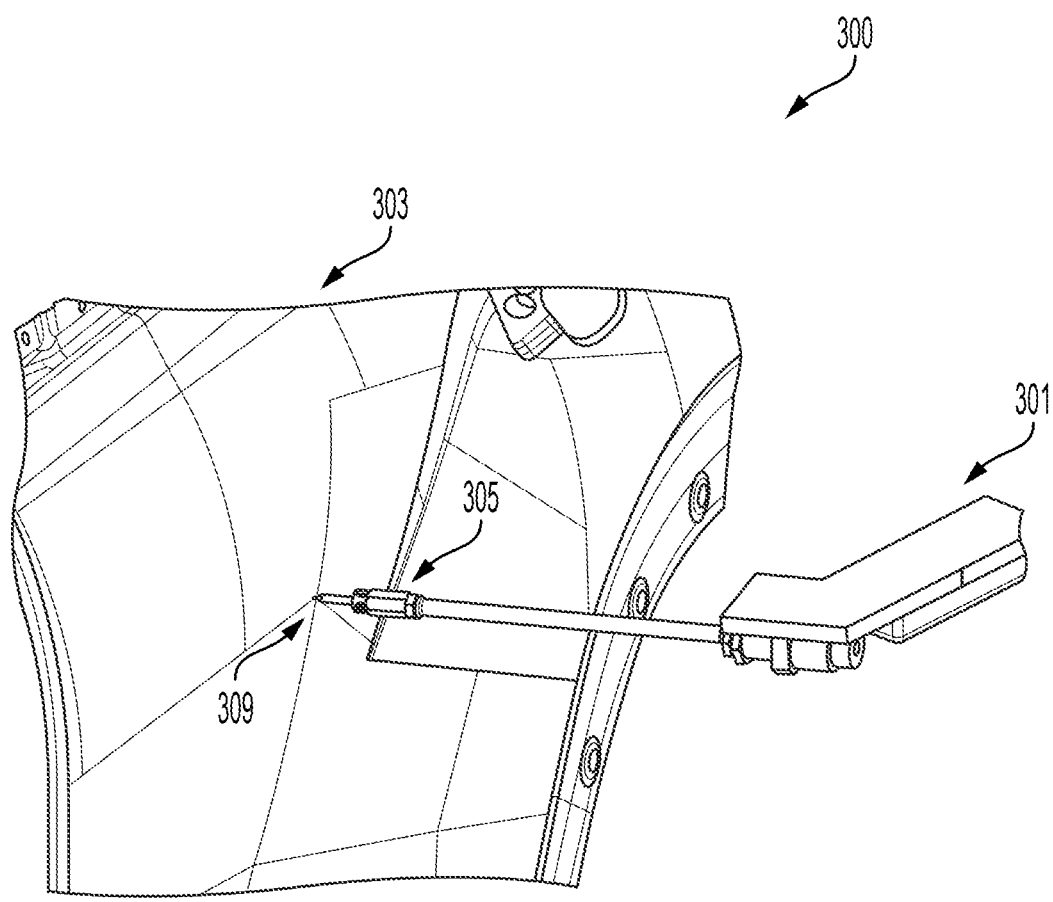
FIG. 3B is an illustration of a portion of a perspective view of a system for calibrating a device by determining a reference point for working on an object according to an embodiment of the present invention.

FIG. 3B is an illustration of a portion of a perspective view of the system 300 including the device 301, the object 303, and the calibration apparatus 305. The calibration apparatus 305 may be utilized for calibration of the device 301 by determining a reference point (e.g., a tool center point (TCP)) for working on the object 303.

In various embodiments, the calibration apparatus 305 may be connected (e.g., removably) to the device 301. The calibration apparatus 305 may be similar to the calibration apparatus 200 described herein with respect to FIGS. 2A-2C and include a pin member (e.g., similar to the pin member 202 described herein with respect to FIGS. 2A-2C), a shell member (e.g., similar to the shell member 204 described herein with respect to FIGS. 2A-2C), an elastic member (e.g., similar to the elastic member 206 described herein with respect to FIGS. 2A-2C), and a base member (e.g., similar to the base member 208 described herein with respect to FIGS. 2A-2C).

In various embodiments, the system 300 may include the controller 350 shown in FIG. 3A (e.g., similar to the controller 102 described herein with respect to FIG. 1) configured to perform a plurality of instructions and control at least the device 301. The controller 350 (e.g., via a processor connected thereto) may determine an expected set of coordinates of a predetermined point 309 on the object 303 based on, e.g., sensor data detected by the one or more sensors 307 coupled to, e.g., the processor. Further, the controller 350 may determine an actual set of coordinates of the predetermined point 309 on the object 303 based on a position of a tip on a pin member of the calibration apparatus 305. Moreover, the controller 350 may determine an offset between the expected set of coordinates of the predetermined point 309 on the object 303 and the actual set of coordinates of the predetermined point 309 on the object 303. Additionally, the controller 350 may store the offset on a memory connected to the processor and determine the reference point based on the stored offset. The offset (and thus the reference point) may be determined based on a first mark on the pin member of the calibration apparatus 305 and the second mark on the shell member of the calibration apparatus 305 being aligned while the tip on the pin member of the calibration apparatus 305 is in contact with the predetermined point 309 on the object 303 as described herein, e.g., with respect to FIGS. 2A-2C. The expected set of coordinates of the predetermined point 309 on the object 303 and the actual set of coordinates of the predetermined point 309 on the object 303 may each include a three-dimensional set of coordinates (i.e., in x, y, and z directions).

In some embodiments, the controller 350 may control the device 301 to work on the object 303 based on the determined reference point. In some embodiments, the controller 350 may determine an actual set of coordinates of a predetermined point on a second object of the same kind or type as that of the object 303 corresponding to the predetermined point 309 on the object 303 based on sensor data of the second object and the offset determined using the object 303. For example, when the device 301 is to work (i) on a different part on the object 303 or (ii) on the second object (e.g., on a part of the second object similar to the part on the object 303 corresponding to the predetermined point 309), the device 301 may determine a set of coordinates with respect to the second object based on the sensor data of the second object detected by the one or more sensors 307, and then apply the offset determined using the object 303 to determine a second set of coordinates (i.e., a set of actual coordinates) corresponding to the second object.

In various embodiments, an example sequence of operations may be as follows. The calibration apparatus 305 may be mounted on an end of a tool on the device 301. The object 303 may be set in front of the device 301. The object 303 may have the predetermined point 309—e.g., a marking (e.g., a clear definable marking based on features visible on the object 303, a manually defined marking such as a dot on a piece of tape, or the like). The calibration apparatus 305 mounted on the end of the tool on the device 301 may be moved to within a threshold distance of the predetermined point 309 on the object 303. For example, the threshold distance may be based on a predetermined margin of error associated with an object, a sensor, or the like. The tip on the calibration apparatus 305 may be aligned in two-dimensional space (e.g., in x and y directions) to meet the predetermined point 309 on the object 303. Then, the tip on the calibration apparatus 305 may be moved to contact the predetermined point 309 on the object 303 and adjusted such that the first mark on the pin member of the calibration apparatus 305 and the second mark on the shell member of the calibration apparatus 305 are aligned. Data corresponding to the position and/or the orientation of the device 301 may be stored on the memory connected to the controller 350.

Then, the object 303 may be moved in an arbitrary amount in x, y, and/or z directions. The one or more sensors 307 may be used to determine an offset—a change in the coordinates in the x, y, and/or z directions for the predetermined point 309 on the object 303 (i.e., after the move) based on sensor data of the object 303 after the move as detected by the one or more sensors 307. The device 301 (i.e., the tip on the pin member of the calibration apparatus 305 attached to the device 301) may be moved, based on the determined offset, to a new set of coordinates corresponding to a reference point (e.g., TCP) with the offset (i.e., to a new location corresponding to the predetermined point 309 on the object 303 after the move)—$(X_1, Y_1, Z_1)$. Then, the tip on the calibration apparatus 305 may be re-aligned such that the tip on the calibration apparatus 305 is aligned with the predetermined point 309 on the object 303 in its new location in the x and y directions. Following, the first mark and the second mark on the calibration apparatus 305 may be aligned to determine an adjusted set of coordinates corresponding to a re-aligned reference point (e.g., a re-aligned TCP) with the offset, which may be determined and stored as $(X_2, Y_2, Z_2)$. Then, a distance formula shown below may be used to calculate the error in the offset determined via the one or more sensors 307.

$$\text{Error} = \sqrt{(X_2 - X_1)^2 + (Y_2 - Y_1)^2 + (Z_2 - Z_1)^2} \quad (1)$$

In various embodiments, the foregoing sequence of operations may be repeated for other points on the object 303 to ensure repeatability. One or more steps of the foregoing sequence of operations may be performed manually by an operator (e.g., the device 301 may be enabled to be moved manually by the operator for one or more of the steps of the foregoing sequence of operations). One or more steps of the foregoing sequence of operations may be performed automatically based on a control of the device 301 by the controller 350. In some embodiments, data relating to the error in the offset and/or the coordinates of the predetermined position 309 as observed via the one or more sensors 307 may be determined and stored on the memory based on one or more categories corresponding to the type(s) of the object 303 and/or the type(s) of the one or more sensors 307. Such stored information may be useful to determine the reference point (TCP) and/or enable the device 301 to move (e.g., to work on an object or a part) more accurately.

Figure 3C:
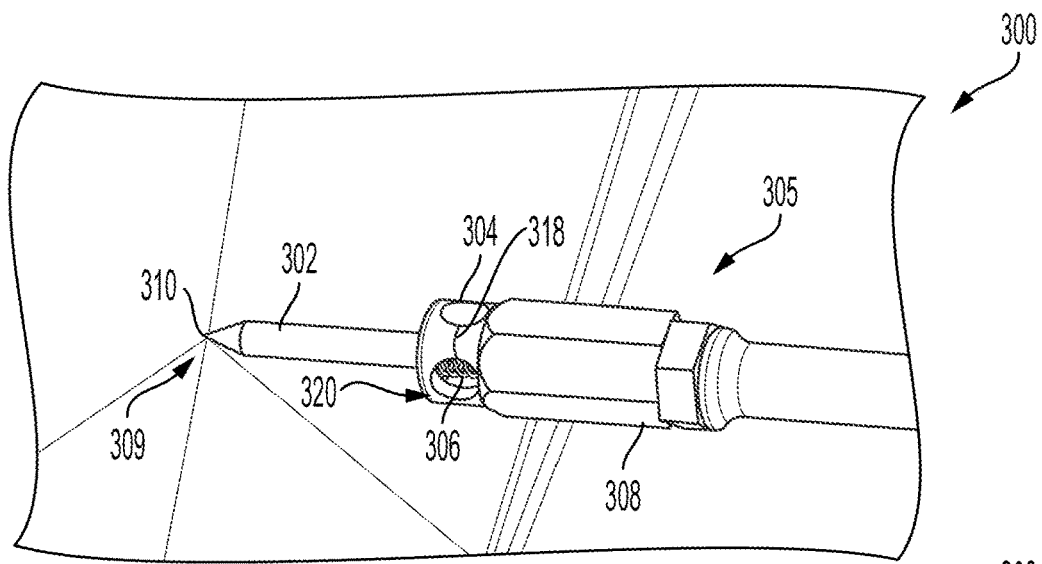
FIG. 3C is an illustration of a portion of a perspective view of a system for calibrating a device by determining a reference point for working on an object according to an embodiment of the present invention.

FIG. 3C is an illustration of a portion of a perspective view of the system 300. The system 300 may include the calibration apparatus 305 having a pin member 302 (similar to the pin member 202 described herein with respect to FIGS. 2A-2C), a shell member 304 (similar to the shell member 204 described herein with respect to FIGS. 2A-2C), an elastic member 306 (similar to the elastic member 206 described herein with respect to FIGS. 2A-2C), and a base member 308 (similar to the base member 208 described herein with respect to FIGS. 2A-2C). The pin member 302 may include a tip 310 (similar to the tip 210 described herein with respect to FIGS. 2A-2C). The shell member 304 may include a second mark 318 (similar to the second mark 218 described herein with respect to FIGS. 2A-2C) and one or more side openings 320 (similar to the one or more side openings 220 described herein with respect to FIGS. 2A-2C).

As shown, the tip 310 on the calibration apparatus 305 may be moved to contact the predetermined point 309 as part of the sequence of operations described herein. Before the pin member 302 is adjusted in the z direction as part of the sequence of operations described herein, a first mark 314 (similar to the first mark 214 described herein with respect to FIGS. 2A-2C) on a protrusion 312 (similar to the protrusion 212 described herein with respect to FIGS. 2A-2C) on the pin member 302 and the second mark 318 on the shell member 304 may not be aligned (i.e., the new reference point is not yet obtained).

Figure 3D:
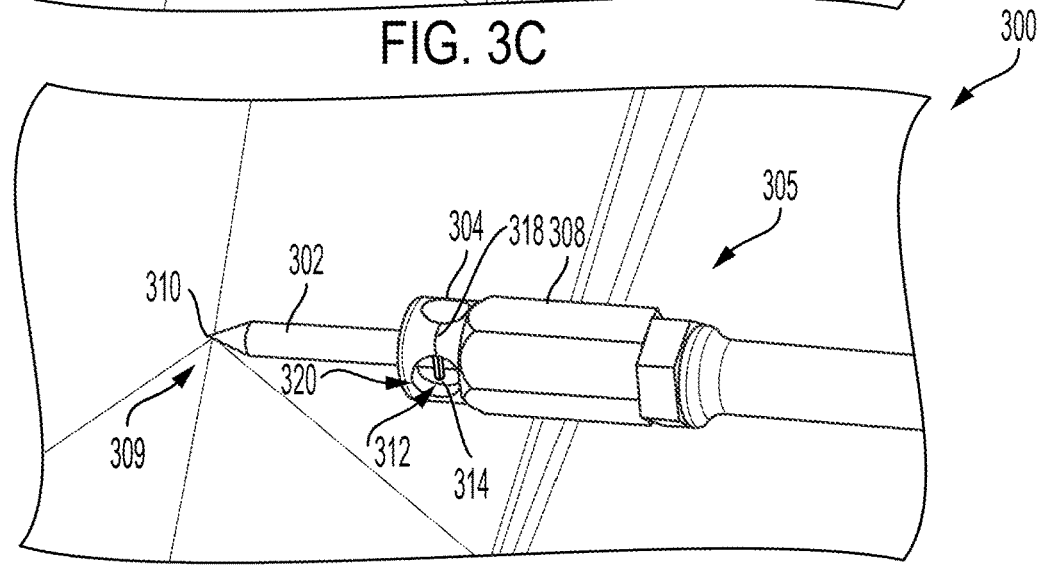
FIG. 3D is an illustration of a portion of a perspective view of a system for calibrating a device by determining a reference point for working on an object according to an embodiment of the present invention.

Referring now to FIG. 3D illustrating a portion of a perspective view of the system 300, the calibration apparatus 305 may be pushed against the object 303 such that the pin member 302 may be moved within the shell member 304 and the base member 308 as the elastic member 306 is retracted to expose the first mark 314 on the protrusion 312 on the pin member 302 through the one or more side openings 320 on the shell member 304.

Figure 3E:
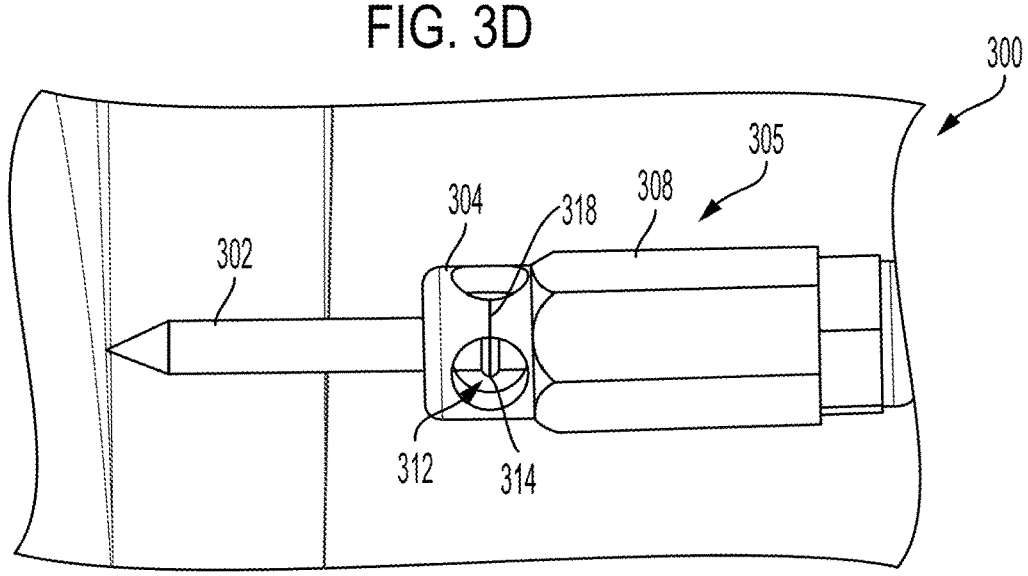
FIG. 3E is an illustration of a portion of a side view of a system for calibrating a device by determining a reference point for working on an object according to an embodiment of the present invention.

As shown in FIG. 3E illustrating a portion of a side view of the system 300, the calibration apparatus 305 may be moved such that the first mark 314 on the protrusion 312 on the pin member 302 is aligned with the second mark 318 on the shell member 304. When the first mark 314 on the protrusion 312 on the pin member 302 is aligned with the second mark 318 on the shell member 304, the new reference point may be determined as described herein with respect to FIGS. 2A-2C as well as FIG. 3B.

Figure 4:
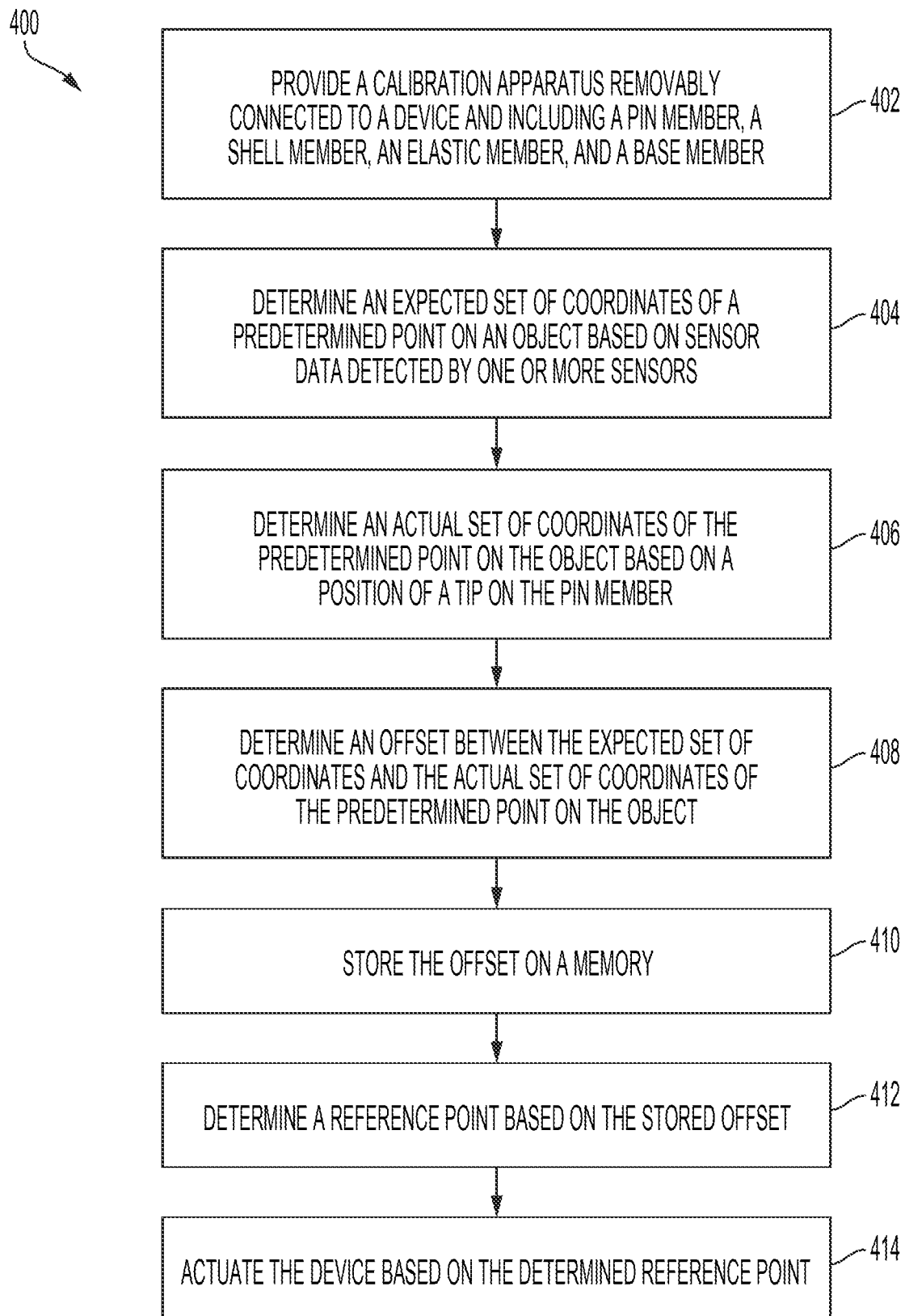
FIG. 4 is a flowchart of a method for calibrating a device by determining a reference point for working on an object according to an embodiment of the present invention.

FIG. 4 is a flowchart of a method 400 for calibrating a device by determining a reference point for working on an object. The method 400, at least in part, may be implemented via a plurality of instructions (e.g., a software program) stored on a memory (similar to the memory described herein with respect to, e.g., FIG. 3B) and accessed and processed by a processor (e.g., on or within the controller 102 and the controller 350 described herein with respect to, respectively, FIGS. 1 and 3A) to perform the various steps of the method 400. In some embodiments, the method 400 may include a plurality of operations for further calibrating a reference point for working on an object after an initial reference point has been determined and/or after moving the object to change its position, orientation, location, or the like from its previous position, orientation, location, or the like used to determine a previous reference point.

The method 400 may include providing a calibration apparatus (see step 402). As described herein, the calibration apparatus may be connected (e.g., removably) to the device. In various embodiments, the calibration apparatus may include a pin member, a shell member, an elastic member, and a base member as described herein with respect to, e.g., FIGS. 2A-2C.

As shown, in step 404, the method 400 may include determining an expected set of coordinates of a predetermined point on the object based on sensor data detected by one or more sensors coupled to the processor. For example, the detected sensor data and a coordinate system based on a predetermined reference point (e.g., a default reference point stored on the memory, a predetermined reference point such as, e.g., a previously determined tool center point (TCP) determined based on the sequence of operations described herein with respect to, e.g., FIG. 3B, etc.) may be used by the processor to determine the expected set of coordinates of the predetermined point on the object. In some embodiments, the object may be the same object (i.e., of the same type or kind) used for the determination of the predetermined reference point in a different position, orientation, location, or the like than the position, orientation, location, or the like used for the determination of the predetermined reference point. For example, the objects may be the same ones of a vehicle door or another vehicle component. In some embodiments, the object may be a different object than the object used for the determination of the predetermined reference point, but with a same part (i.e., of the same type or kind) as the same part having the predetermined point on the object used for the determination of the predetermined reference point. For example, the different objects may be different types of vehicle doors, and the same parts may be the same ones of a door handle or the like.

In step 406, the method 400 may include determining an actual set of coordinates of the predetermined point on the object based on a position of a tip on the pin member. For example, determining the actual set of coordinates of the predetermined point on the object may include, e.g., manually aligning a tip on the calibration apparatus on the device with the predetermined point on the object in the x and y directions and then adjusting the calibration apparatus in the z direction as described herein.

In step 408, the method 400 may include determining an offset between the expected set of coordinates of the predetermined point on the object and the actual set of coordinates of the predetermined point on the object. For example, the offset may be determined based on the equation (1) described herein when the expected set of coordinates of the predetermined point on the object and the actual set of coordinates of the predetermined point on the object do not match for various reasons (e.g., new object to be worked on, poorly calibrated device or sensor, etc.).

In step 410, the method 400 may include storing data including the offset on a memory connected to a controller.

In step 412, the method 400 may include determining the reference point based on the stored offset. That is, a previously determined reference point or TCP may be adjusted based on the stored offset to determine a new reference point. The new reference point may be a re-aligned TCP corresponding to the object, the part, and/or the one or more sensors. As described herein, the new reference point (and/or the new offset) may be stored on the memory and categorized by the type or kind of the object, the type or kind of the part, and/or the type or kind of the one or more sensors—to be referenced as, e.g., the previously determined reference point or offset.

In step 414, the method 400 may include actuating the device to work on the object based on the determined reference point. That is, the new reference point may be used to adjust the coordinate system that may be used for actuating the device by the processor to work on the object.

In some embodiments, determining the actual set of coordinates of the predetermined point on the object may include controlling the device such that the tip on the pin member is moved to contact the object at the predetermined point. The device may be controlled automatically based on the sensor data until the controller determines that a first mark on the pin member and a second mark on the shell member are aligned based on the sensor data while the tip on the pin member is in contact with the object at the predetermined point. Alternatively, the device may be controlled to enable the device to be moved manually by an operator until the first mark on the pin member and the second mark on the shell member are aligned while the tip on the pin member is in contact with the object at the predetermined point. That is, the alignment of the first mark and the second mark may be verified manually by the operator.

Where used throughout the specification and the claims, "at least one of A or B" includes "A" only, "B" only, or "A and B." Exemplary embodiments of the apparatuses, the systems, and the methods described herein have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments (e.g., including a singular element where multiple elements are described and/or multiple elements where a singular element is described, etc.) that reasonably fall within the scope of the advancement to the art hereby contributed, and that that scope shall not be restricted, except in light of the appended claims and their equivalents.

What is claimed is:

1. A system for calibrating a device by determining a reference point for working on an object, the system comprising:
   a calibration apparatus removably connected to the device and including:
      a pin member including a tip, a protrusion, a first mark, and a distal end,
      a shell member including a second mark and an opening and receiving at least a first portion of the pin member including the protrusion therethrough starting from the tip on the pin member, the opening exposing the first mark on the pin member when the first mark on the pin member is aligned with the second mark on the shell member,
      an elastic member receiving at least a second portion of the pin member therethrough starting from the distal end on the pin member, at least a portion of the elastic member being received within the shell member, and
      a base member (i) receiving at least a third portion of the pin member therethrough starting from the distal end on the pin member and (ii) including a rim member receiving at least the third portion of the pin member therethrough starting from the distal end on the pin member and supporting one end of the elastic member such that the elastic member is disposed between the protrusion on the pin member and the rim member on the base member and engages the protrusion on the pin member to push the pin member away from the base member; and
a processor connected to the device and configured to:
determine an expected set of coordinates of a predetermined point on the object based on sensor data detected by one or more sensors coupled to the processor,
determine an actual set of coordinates of the predetermined point on the object based on a position of the tip on the pin member,
determine an offset between the expected set of coordinates of the predetermined point on the object and the actual set of coordinates of the predetermined point on the object,
store data including the offset on a memory connected to the processor, and
determine the reference point based on the stored data.

2. The system of claim 1, wherein the processor is further configured to control the device to work on the object based on the determined reference point.

3. The system of claim 1, wherein the determination of the offset is based on a determination of the actual set of coordinates of the predetermined point on the object when the first mark on the pin member and the second mark on the shell member are aligned while the tip on the pin member of the calibration apparatus is in contact with the predetermined point on the object.

4. The system of claim 1, wherein the device is or includes a robot gun or an end effector.

5. The system of claim 1, wherein the expected set of coordinates of the predetermined point on the object and the actual set of coordinates of the predetermined point on the object each include a three-dimensional set of coordinates.

6. The system of claim 1, wherein the processor is further configured to determine an actual set of coordinates of a predetermined point on a second object corresponding to the predetermined point on the object based on sensor data of the second object and the offset, the second object being of the same kind or type as the object.

7. The system of claim 6, wherein the object and the second object are, respectively, parts of the same kind or type on different products.

8. The system of claim 1, wherein the reference point is a tool center point (TCP) to be utilized by the device for working on the object.

9. The system of claim 1, wherein the processor is further configured to store categorization data corresponding to the offset based on a kind or type of at least one of the object or the one or more sensors.

10. An apparatus for calibrating a device by determining a reference point for working on an object, the apparatus comprising:
a pin member including a tip, a protrusion, a first mark, and a distal end;
a shell member including a second mark and an opening and receiving at least a first portion of the pin member including the protrusion therethrough starting from the tip on the pin member, the opening exposing the first mark on the pin member when the first mark on the pin member is aligned with the second mark on the shell member;
an elastic member receiving at least a second portion of the pin member therethrough starting from the distal end on the pin member, at least a portion of the elastic member being received within the shell member; and
a base member (i) receiving at least a third portion of the pin member therethrough starting from the distal end on the pin member and (ii) including a rim member receiving at least the third portion of the pin member therethrough starting from the distal end on the pin member and supporting one end of the elastic member such that the elastic member is disposed between the protrusion on the pin member and the rim member on the base member and engages the protrusion on the pin member to push the pin member away from the base member.

11. The apparatus of claim 10, wherein the first mark is a notch on the protrusion on the pin member.

12. The apparatus of claim 10, wherein the second mark is a notch on the shell member.

13. The apparatus of claim 10, wherein the base member includes or is configured to connect to a connector configured for removably connecting the apparatus to the device.

14. The apparatus of claim 10, wherein the shell member further includes a first connector, and the base member further includes a second connect, wherein the first connector on the shell member is configured for engaging with the second connector on the base member.

15. The apparatus of 10, wherein the rim member extends radially inward from the base member.

16. The apparatus of 10, wherein the base member further includes a cavity to receive a portion of the pin member starting from the distal end and through the rim member on the base member when the first mark on the pin member is aligned with the second mark on the shell member.

17. A method for calibrating a device by determining a reference point for working on an object, the method comprising:
providing a calibration apparatus removably connected to the device and including:
a pin member including a tip, a protrusion, a first mark, and a distal end,
a shell member including a second mark and an opening and receiving at least a first portion of the pin member including the protrusion therethrough starting from the tip on the pin member, the opening exposing the first mark on the pin member when the first mark on the pin member is aligned with the second mark on the shell member,
an elastic member receiving at least a second portion of the pin member therethrough starting from the distal end on the pin member, at least a portion of the elastic member being received within the shell member, and
a base member (i) receiving at least a third portion of the pin member therethrough starting from the distal end on the pin member and (ii) including a rim member receiving at least the third portion of the pin member therethrough starting from the distal end on the pin member and supporting one end of the elastic member such that the elastic member is disposed between the protrusion on the pin member and the rim member on the base member and engages the protrusion on the pin member to push the pin member away from the base member;
determining, by a processor connected to the device, an expected set of coordinates of a predetermined point on the object based on sensor data detected by one or more sensors coupled to the processor;
determining, by the processor, an actual set of coordinates of the predetermined point on the object based on a position of the tip on the pin member;
determining, by the processor, an offset between the expected set of coordinates of the predetermined point on the object and the actual set of coordinates of the predetermined point on the object;

storing, by the processor, data including the offset on a memory connected to the processor;

determining, by the processor, the reference point based on the stored data; and actuating, by the processor, the device to work on the object based on the determined reference point.

18. The method of claim 17, wherein determining the actual set of coordinates of the predetermined point on the object includes controlling the device such that the tip on the pin member is moved to contact the object at the predetermined point.

19. The method of claim 18, wherein controlling the device such that the tip on the pin member is moved to contact the object at the predetermined point includes automatically controlling the device based on the sensor data until the processor determines that the first mark on the pin member and the second mark on the shell member are aligned based on the sensor data.

20. The method of claim 18, wherein controlling the device such that the tip on the pin member is moved to contact the object at the predetermined point includes enabling the device to be moved manually by an operator until the first mark on the pin member and the second mark on the shell member are aligned.

* * * * *